United States Patent
Mishra et al.

(10) Patent No.: US 6,389,589 B1
(45) Date of Patent: *May 14, 2002

(54) CLASS STORE SCHEMA

(75) Inventors: Debi P. Mishra; Markus Horstmann; Ullattil Shaji, all of Redmond, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/158,023

(22) Filed: Sep. 21, 1998

(51) Int. Cl.[7] ............................ G06F 9/445; G06F 17/30
(52) U.S. Cl. .................... 717/11; 709/203; 709/219; 709/242; 709/244; 707/9; 707/10; 707/103 R; 707/104.1
(58) Field of Search ......................... 717/11; 713/100, 713/155, 156, 162, 182, 201, 200; 709/203, 217, 221–223, 242, 244, 239, 219; 707/10, 104, 203, 204, 9, 103 R, 103 Y, 103 Z, 103

(56) References Cited

U.S. PATENT DOCUMENTS

| | | |
|---|---|---|
| 5,421,009 A | 5/1995 | Platt |
| 5,473,772 A | 12/1995 | Halliwell et al. |
| 5,535,326 A | 7/1996 | Baskey et al. |
| 5,555,416 A | 9/1996 | Owens et al. |
| 5,586,304 A | 12/1996 | Stupek, Jr. et al. ......... 717/170 |
| 5,625,823 A | 4/1997 | Debenedictis et al. |
| 5,630,076 A | 5/1997 | Saulpaugh et al. |
| 5,644,766 A * | 7/1997 | Coy et al. .................... 707/204 |
| 5,655,081 A | 8/1997 | Bonnell et al. |
| 5,659,547 A | 8/1997 | Scarr et al. |

(List continued on next page.)

OTHER PUBLICATIONS

Jay Lang, "IBM Bolsters Windows NT Reliability With Tools Suite—Package Provides interoperability with other platforms," Information Week, Jul. 20, 1998, pp. A6 (5 pages).*

(List continued on next page.)

Primary Examiner—Tuan Q. Dam
(74) Attorney, Agent, or Firm—Michalik & Wylie, PLLC

(57) ABSTRACT

A schema that facilitates the centralized management and deployment of applications, components and services across a computer network. Centralized class stores are provided under policies associated with a directory container such as a site, domain or organizational unit. Class stores include definition, state and location information for applications and components, such that applications and components are centrally available as needed. For example, via the class store, updates to components or applications for users under an organizational unit are performed once in a centralized location, whereby users or machines may automatically obtain new versions of applications as they become available, or software implementations as needed from a centralized repository. Class stores may be configured to contain packages of component and application information according to functional areas, level of security access, or other criteria as determined by an administrator. Component categories (e.g., spreadsheet, word processor, and so on) may also be maintained, whereby a suitable application may be located by its function. For customized administration and programmatic query or installation of specific components and packages, the class store also includes a manager object that offers a set of interfaces and APIs.

63 Claims, 8 Drawing Sheets

U.S. PATENT DOCUMENTS

| | | | |
|---|---|---|---|
| 5,692,129 A | | 11/1997 | Sonderegger et al. |
| 5,732,266 A | | 3/1998 | Moore et al. |
| 5,732,275 A | | 3/1998 | Kullick et al. |
| 5,742,829 A | | 4/1998 | Davis et al. |
| 5,752,042 A | * | 5/1998 | Cole et al. .................. 395/712 |
| 5,764,992 A | | 6/1998 | Kullick et al. |
| 5,768,566 A | | 6/1998 | Harikrishnan et al. ...... 717/170 |
| 5,778,234 A | * | 7/1998 | Hecht et al. ................ 395/712 |
| 5,784,612 A | | 7/1998 | Crane et al. |
| 5,790,664 A | * | 8/1998 | Coley et al. .................. 380/4 |
| 5,790,856 A | | 8/1998 | Lillich |
| 5,796,967 A | | 8/1998 | Filepp et al. |
| 5,805,897 A | | 9/1998 | Glowny |
| 5,835,911 A | | 11/1998 | Nakagawa et al. |
| 5,859,969 A | | 1/1999 | Oki et al. |
| 5,859,978 A | | 1/1999 | Sonderegger et al. |
| 5,867,713 A | | 2/1999 | Shrader et al. |
| 5,867,714 A | | 2/1999 | Todd et al. |
| 5,870,762 A | | 2/1999 | Lee |
| 5,897,640 A | * | 4/1999 | Veghte et al. ............... 707/202 |
| 5,925,127 A | * | 7/1999 | Ahmad ....................... 713/200 |
| 5,930,513 A | * | 7/1999 | Taylor ......................... 395/712 |
| 5,930,514 A | | 7/1999 | Thompson et al. ......... 717/170 |
| 5,933,647 A | | 8/1999 | Aronberg et al. |
| 5,954,827 A | | 9/1999 | Frank et al. |
| 5,960,204 A | | 9/1999 | Yinger et al. |
| 5,966,540 A | | 10/1999 | Lister et al. ................. 717/174 |
| 5,978,590 A | | 11/1999 | Imai et al. |
| 5,987,504 A | * | 11/1999 | Toga ........................... 709/206 |
| 5,999,740 A | | 12/1999 | Rowley |
| 6,006,034 A | | 12/1999 | Heath et al. |
| 6,006,035 A | * | 12/1999 | Nabahi ....................... 395/712 |
| 6,009,274 A | | 12/1999 | Fletcher et al. |
| 6,009,401 A | * | 12/1999 | Horstmann .................... 705/1 |
| 6,021,438 A | | 2/2000 | Duvvoori et al. |
| 6,023,586 A | | 2/2000 | Gaisford et al. |
| 6,029,147 A | * | 2/2000 | Horadan et al. ............. 705/35 |
| 6,041,333 A | * | 3/2000 | Bretschneider et al. ..... 707/203 |
| 6,067,582 A | | 5/2000 | Smith et al. |
| 6,131,192 A | | 10/2000 | Henry |
| 6,151,643 A | | 11/2000 | Cheng et al. |
| 6,151,708 A | | 11/2000 | Pedrizetti et al. |
| 6,161,218 A | | 12/2000 | Taylor |
| 6,205,527 B1 | | 3/2001 | Goshey et al. .............. 711/162 |

OTHER PUBLICATIONS

"Automating Microsoft Transaction Server Client Installation". Document [online]. Microsoft Corporation, Jun. 1997 [retrieved on Feb. 29, 2000]. Retrieved from the Internet.* <URL:wysiwyg://MAIN.PRODINFO.6/http://msdn.mi . . . m/library/backgrnd/html/msdn_install.html>.*

Michael B. Jones, "The Microsoft Interactive TV System: An Experience Report", Microsoft Corporation, Technical Report MSR–TR–97–18, Jul. 1997.*

"IBM ADSTAR Distributed Storage Manager basic concepts", IBM document Retrieved from <http://www.storage-.ibm.com/software/adsm/adbasics.htm>, Oct. 31, 1997, pp. 1–8.*

Green, "Windows Apps Need To Be Aware of Install Methods", *Network World*, pg. 45 (Nov. 1994).

McKinney et al., "Win Tips Windows 9x", *Windows Magazine*, pgs. 255–258 (Aug. 1998).

McNutt, "Administering X Sites", *Unix Review*, pp. 45ff (Jul. 1992).

Methvin, David, "Problems? In Win98?", *Windows Magazine*, pp. 224ff (Oct. 1998).

Spanbauer, Scott, "Internet Explorer 4.0, Problem Child", *PC World*, pp. 53 (Jan. 1998).

"Seagate Enterprise Management Software–East Announces Release of Desktop Management Suite; Best–of–Breed Point Solutions Integrated to Provide Heterogenous LAN Management," *Business Wire*, P. 04020056 (Apr. 2, 1996).

Dunigan, et al., *MCSE Training Guide: Windows NT Workstation 4*, New Riders Publishing, pp. 28–32, 402–405, 486–492 (1997).

* cited by examiner

CLASS STORE SCHEMA

RELATED APPLICATIONS

This application is related to the following United States Patent applications, all of which are filed on the same day and assigned to the same assignee as the present application:

"Method and System for Assigning and Publishing Applications" Ser. No. 09/158,968;

"Method and System for Advertising Applications" Ser. No. 09/158,967;

"Method and System for On-Demand Installation of Software Implementations" Ser. No. 09/158,022; and "Software Implementation Installer Mechanism" Ser. No. 09/158,021.

FIELD OF THE INVENTION

The invention relates generally to computer systems, and more particularly to the management and deployment of applications, components and services across a computer network.

BACKGROUND OF THE INVENTION

Lost productivity at employees' computer desktops is a major cost for corporations, often resulting from user errors such as removing a software component or using an old application rather than an enterprise-specified one that is improved, secure and/or compatible with others. Productivity is also lost when a desktop is too complex, such as when the desktop has too many non-essential applications and features thereon. Much of the expense of administering distributed personal computer networks is spent at the desktop, performing tasks such as fixing the applications and settings that the user has incorrectly or inadvertently modified.

At the same time, a significant amount of the information needed to administer a network is haphazardly handed down by enterprise management to an administrator who must then manually implement changes to the network based on the information. For example, management may decide that everyone in the personnel department should use a particular word processor, whereby the administrator manually installs that word processor on the computers in the personnel department. Similarly, management may decide that employees spend too much time browsing the Internet, whereby the administrator receives a memorandum specifying that only certain groups such as the research group and management group should have Internet browsers installed on their machines. In addition to having to uninstall browsers and hope (or regularly check) that non-approved users do not reinstall the browser, such a policy causes problems when multiple users share the same computer.

More complex application deployment problems arise with upgrades to applications, patches, and the ability of some applications to handle multiple types of files and class IDs. Other problems result from differing policy needs, e.g., all users are to receive the same electronic mail program and word processing program, but only a subset of an enterprise's users will be able to receive a spreadsheet program, and then only those user's who want it. As can be readily appreciated, a significantly large number of such policy permutations may exist with respect to deploying applications in an enterprise, however no schema for and tracking and managing application deployment has heretofore existed.

SUMMARY OF THE INVENTION

Briefly, the present invention provides a class store schema for facilitating the management and deployment of applications, components and services across a computer network. Centralized class stores are provided, which include state, definition and location information for applications and components, such that applications and components are made centrally available as needed. For example, via the class store, updates to components or applications are performed once in a centralized location, whereby users may automatically obtain new versions of applications as they become available. Similarly, if a software implementation (e.g., object class) is needed but is not available in the local registry, the system looks in the class stores for a suitable implementation. In this manner, the COM libraries, Shell, and Internet Explorer automatically use the class store to dynamically install missing applications or components.

In a described embodiment, the Windows NT 5.0 Active Directory defines an administrative hierarchy wherein policies and class stores associated therewith are centrally supported, such that applications and components may be centrally assigned and provided to policy recipients including individual users, individual computers, or a group of users (e.g., in an Organizational Unit). Class stores may be configured to contain packages of component and application information according to functional areas, level of security access, or other criteria as determined by an administrator. Component categories (e.g., spreadsheet, word processor, and so on) may also be maintained, whereby a suitable application may be located by its function. For customized administration and programmatic query/installation for specific components and packages, the class store also includes a manager object that offers a set of interfaces and APIs.

Other advantages will become apparent from the following detailed description when taken in conjunction with the drawings, in which:

DETAILED DESCRIPTION OF THE PREFERRED EMBODIMENT

Exemplary Operating Environment

Figure 1:
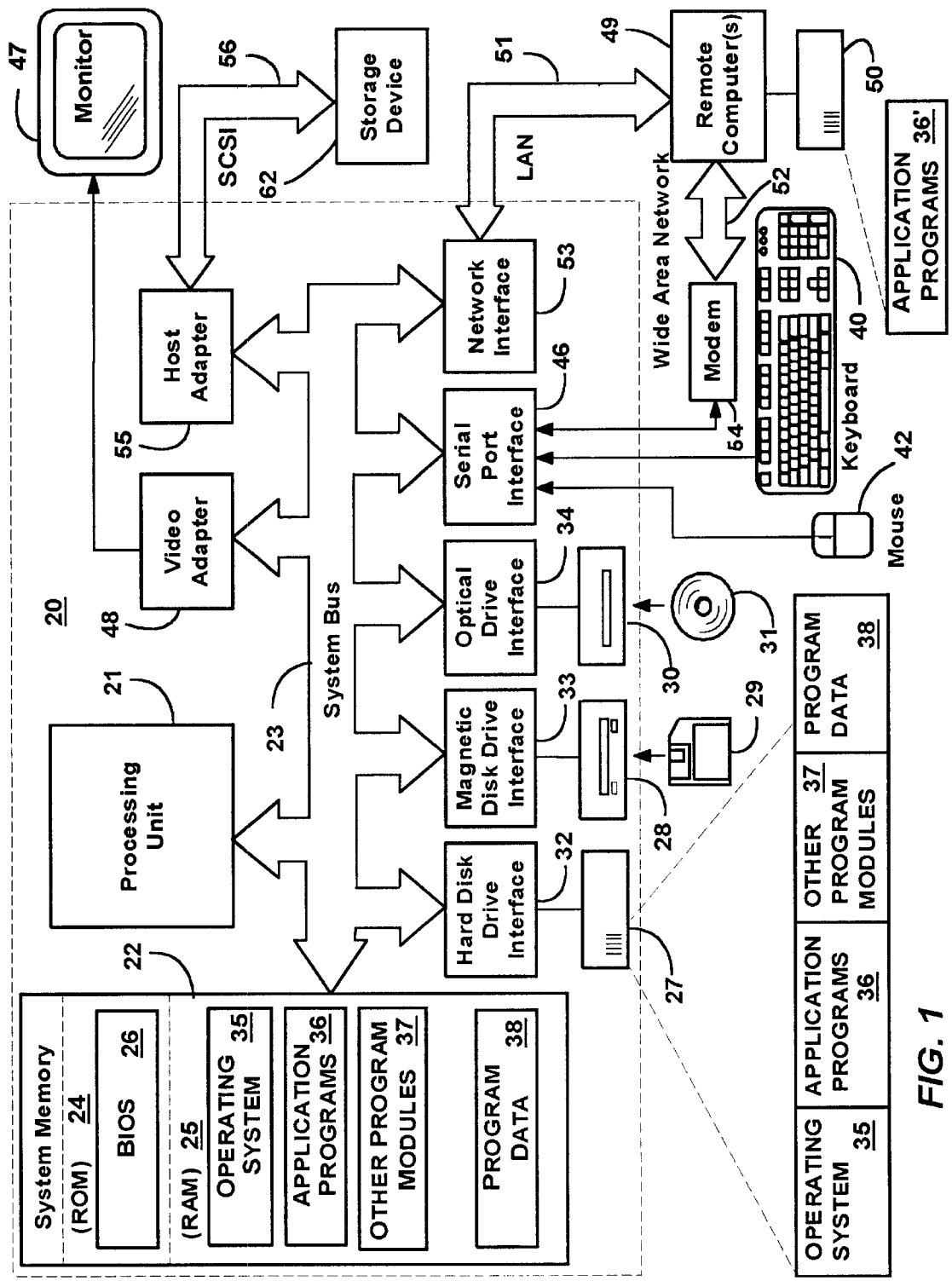
FIG. 1 is a block diagram representing a computer system into which the present invention may be incorporated.

FIG. 1 and the following discussion are intended to provide a brief general description of a suitable computing environment in which the invention may be implemented.

Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

For purposes of the following description, in accordance with aspects of the present invention, a user subject to policy including application deployment policy may be logging onto the computer system 20, while the class store schema is maintained in one or more of the remote computers 49. Notwithstanding, it can be readily appreciated that the class store may physically reside on the client (user) machine.

CLASS STORE SCHEMA

The present invention is described herein with reference to the Microsoft® Windows NT® operating system, and in particular to the flexible hierarchical structure of sites, domains and/or organizational units of a Windows NT® Active Directory 58. Notwithstanding, there is no intention to limit the present invention to Windows NT® or the Active Directory, but on the contrary, the present invention is intended to operate with and provide benefits with any operating system, architecture and/or mechanisms that utilize network information.

Figure 2:
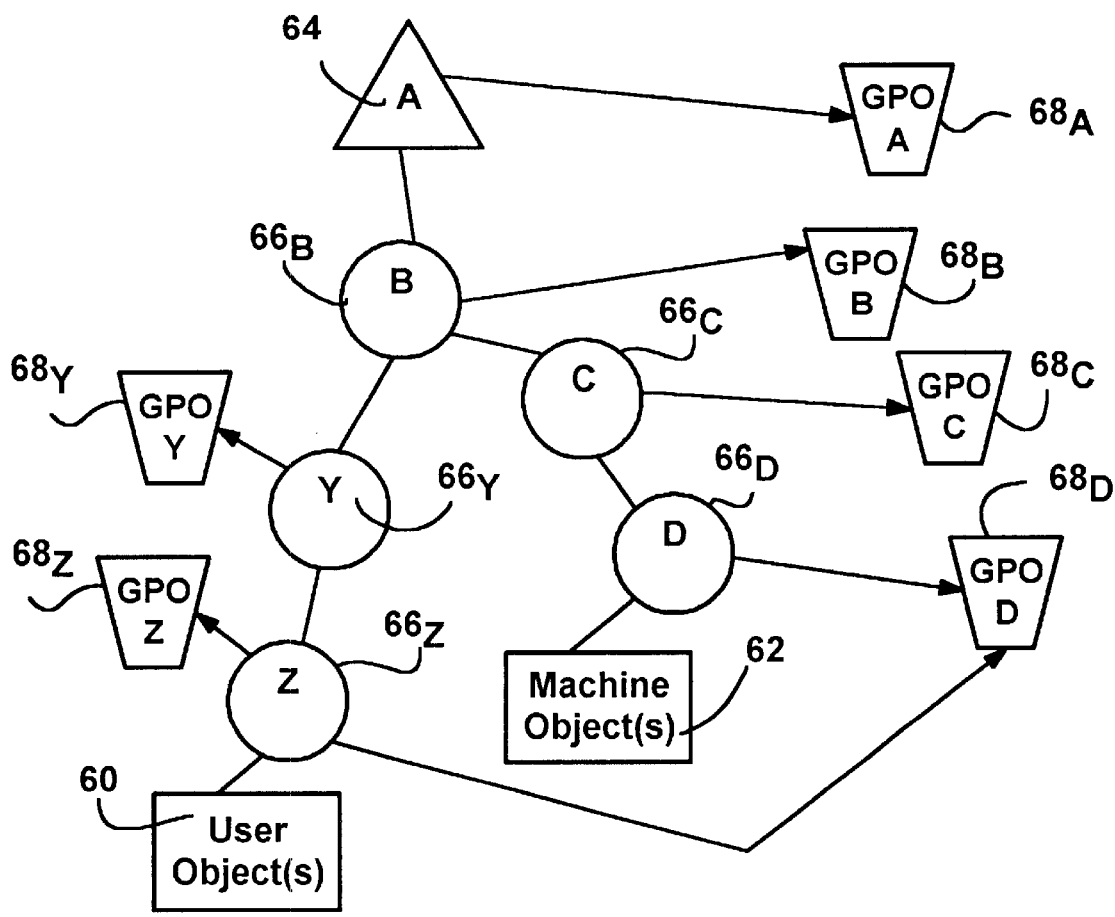
FIG. 2 is a block diagram generally illustrating hierarchical relationships between sites, domains organizational units and group policy objects of an exemplary network.

Users and machines in a domain (collectively policy recipients) have associated user and machine objects 60, 62 (FIG. 2). As shown in FIG. 2, based on a hierarchy of the domain 64 and organizational units (e.g., $66_a$–$66_d$,$66_y$–$66_z$, into which the objects are placed, a policy recipient may have one or more policies (in group policy objects or GPOs) $68_A$–$68D$, $68_Y$–$68_Z$ associated therewith. U.S. patent application Ser. No. 09/134,805 assigned to the assignee of the present invention and hereby incorporated by reference herein in its entirety, describes how the policy within an organization is managed using group policy. In general, group policy is an umbrella under which manageable policies are maintained. Any directory container, e.g., site, domain or organizational unit, may be set up by an administrator to be centrally managed using group policy by specifying a group policy that contains the management policy for the organizational unit or domain. For example, a single group policy may contain the policy settings for one or more organizational units or domains, whereby the organizational units and domains that have the same group policy essentially have the same policy enforcement.

Figure 3:
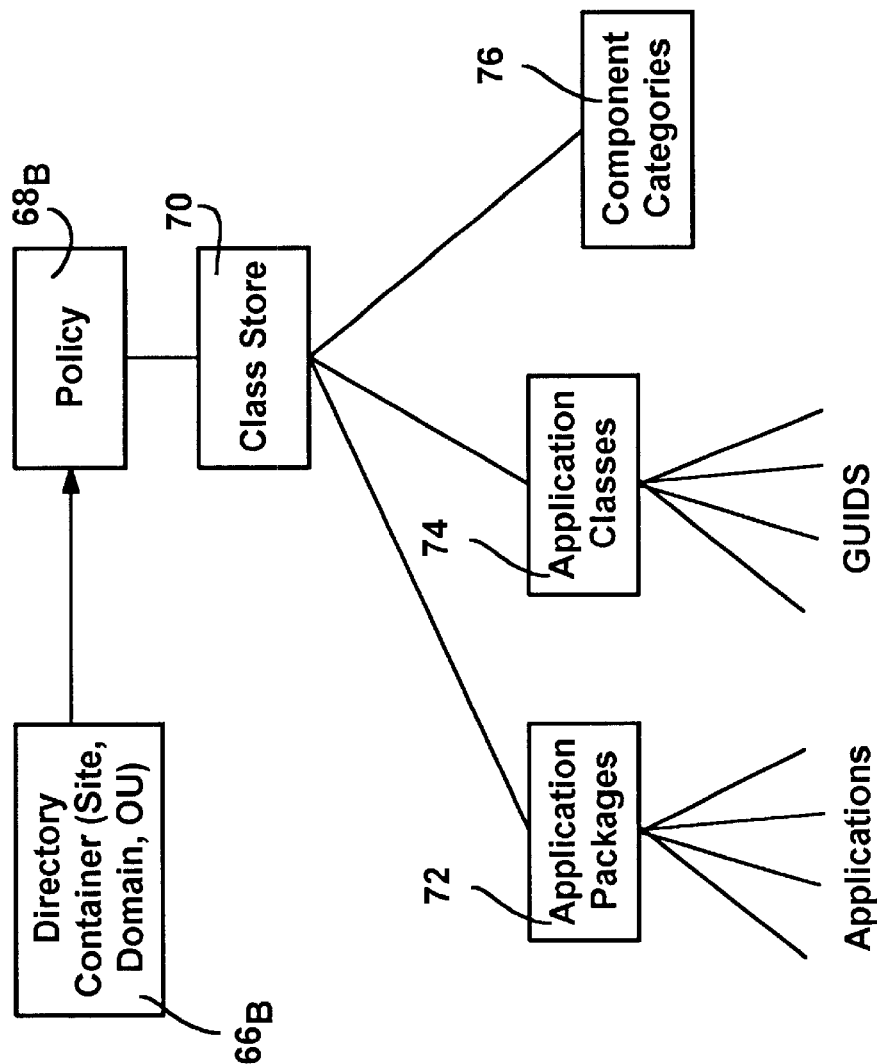
FIG. 3 is a block diagram representing how various containers including a class store container are hierarchically organized under a policy object in accordance with one aspect of the present invention.

A significant policy consideration that may be implemented under a group policy is the management of applications. In accordance with one aspect of the present invention and as shown in FIG. 3, if application management is set up for a group policy, (e.g., object $68_B$), a class store 70 is created under the group policy $66_B$, essentially to store the state of deployment of managed applications. More particularly, the first time the policy administrator attempts to deploy an application under the group policy, a class store is created, and thus the existence of a class store in a group policy indicates that application management is in effect for this group policy. In a preferred embodiment, the class store 70 uses the Windows NT® Active Directory 58 (FIG. 4) as its centralized store and ties into the administrative hierarchy defined thereby, i.e., the class store 70 is a container object (objectclass=ClassStore) in the Active Directory 58. The class store schema is LDAP3.0 based, a standard protocol for Directory access.

The Class Store is the component that provides the framework for deploying application resources in the Active Directory 58 and making the deployment policy available to policy recipients (i.e., users and machines). In other words, the class store container is the administration unit for applications deployment. Access and administration privileges are controlled by standard access control properties on the class store container object 70.

the policy $66_A$ associated therewith, along with any class store or stores of the policy $68_A$ associated with the domain 64. The applications catalogued in a class store define the application policy for the organizational unit or domain associated with the policy, i.e., the class store hosts application deployment. In this manner, applications and/or components in a class store are available as needed, while updates to components and/or applications may be performed once in a centralized location. For example, in accordance with a policy set by an administrator, users may automatically obtain new versions of applications and components as they become available.

FIG. 3 shows various containers under a class store 70, including an application package container 72, object class container 74 and component categories container 76. Packages are stored and cataloged under the class store 70, and may be available from various vendors for different platforms, activation modes, access control, setup, and installation information. A package may include an entire application (e.g., Microsoft® Word or Excel), a set of binary component implementations packaged together, or a standalone COM component (e.g., an ActiveX™ control).

The Class Store object 70 is the top-level container of a Class Store hierarchy. Its Directory object class is Class Store, and as shown in FIG. 3, includes the container objects, CN=Packages, CN=Classes and CN=Categories. The class store object information is set forth in TABLE 1 below: (Key Fields—None)

TABLE 1

| | |
|---|---|
| Common-Name | Class-Store |
| Admin-Display-Name | Class-Store |
| Admin-Description | Class-Store |
| Object-Class | Class-Schema |
| Comment | Class store container |
| LDAP-Display-Name | ClassStore |
| Governs-ID | 1.2.840.113556.1.5.44 |
| Class Type | Structural Class |
| Rdn-Att-Id | Common-Name |
| Schema-ID-GUID | {bf967a84-0de6-11d0-a285-00aa003049e2} |
| Default UI State | Hidden |
| System-Only | FALSE |
| Default-Security-Descriptor | D: (A;;RPWPCRCCDCLCLORCWOWDSDDTSW;;;DA) (A;;RPWPCR CCDCLCLORCWOWDSDDTSW;;;SY) (A;;RPLCLORC;;;AU)S: (A U;SAFA;WDWOSDDTWPCRCCDCSW;;;WD) |
| Subclass of | Top |
| Poss-Superiors | Container;Domain-DNS;Organizational-Unit;Class-Store;User;Group;Computer;Domain-Policy |
| MAY contain | App-Schema-Version<br>Last-Update-Sequence<br>Next-Level-Store<br>Version-Number |

Each policy such as $68_B$ thus may have at least one class store 70 associated therewith to enable the central deployment and management of applications, components and services across a network. As described in detail below, via the policy $68_B$ and the associated class store 70, applications and components may be assigned to a policy recipient comprising a group of users, individual users, or to individual computers of a directory container such as the organizational unit $66_B$. Note that a user or computer can have multiple class stores associated therewith. For example, a user under organizational unit $66_B$ has the class store 70 of Applications and components are generically referred to as packages, and as shown in FIG. 3, are stored under the CN=Packages container 72. The Directory object class for these objects is Package-Registration. Key Fields include File-Extension, Com-ClassId, Categories and ProgID. Relationships include N-to-N with ClassIDs, and N-to-N with Application Categories. The following table, TABLE 2 describes a package container object:

TABLE 2

| Common-Name | Package-Registration |
|---|---|
| Admin-Display-Name | Package-Registration |
| Admin-Description | Package-Registration |
| Object-Class | Class-Schema |
| Comment | Class store: registration information for an application |
| LDAP-Display-Name | Package Registration |
| Governs-ID | 1.2.840.113556.1.5.49 |
| Class Type | Structural Class |
| Rdn-Att-Id | Common-Name |
| Schema-ID-GUID | {bf967aa6-0de6-11d0-a285-00aa003049e2} |
| Default UI State | Hidden |
| System-Only | FALSE |
| Default-Security-Descriptor | D: (A;;RPWPCRCCDCLCLORCWOWDSDDTSW;;;DA) (A;;RPWPCRCCDCLCLORCWOWDSDDTSW;;;SY) (A;;RPLCLORC;;;AU) S: (A U;SAFA;WDWOSDDTWPCRCCDCSW;;;WD) |
| Subclass of | Top |
| Poss-Superiors | Class-Store |
| MAY contain | Can-Upgrade-Script Categories COM-ClassID COM-InterfaceID COM-ProgID COM-Typelib-Id COM-Unique-Package-ID Execution-Context File-Ext-Priority File-Extension Icon-Path Install-Ui-Level Last-Update-Sequence Locale-ID Machine-Architecture Managed-By Msi-File-List Msi-Script Msi-Script-Name Msi-Script-Path Msi-Script-Size OS-Version Package-Flags Package-Name Package-Type Product-Code Setup-Command Upgrade-Product-Code Vendor Version-Number-Hi Version-Number-Lo |

Classes (ClassIDs) are stored under the CN=Classes container 74. The Directory object class for these objects is Class-Registration, key fields include ClassID and ProgID, and the relationships are N-to-N with Packages and N-to-N with Component Categories. The following table, TABLE 3 describes a class container object:

TABLE 3

| Common-Name | Class-Registration |
|---|---|
| Admin-Display-Name | Class-Registration |
| Admin-Description | Class-Registration |
| Object-Class | Class-Schema |
| Comment | Class Store: Registration information for a COM Object |
| LDAP-Display-Name | ClassRegistration |
| Governs-ID | 1.2.840.113556.1.5.10 |
| Class Type | Structural Class |
| Rdn-Att-Id | Common-Name |
| Schema-ID-GUID | {bf967a82-0de6-11d0-a285-00aa003049e2} |
| Default UI State | Hidden |
| System-Only | FALSE |
| Default-Security-Descriptor | D: (A;;RPWPCRCCDCLCLORCWOWDSDDTSW;;;DA) (A;;RPWPCRCCDCLCLORCWOWDSDDTSW;;;SY) (A;;RPLCLORC;;;AU) S: (AU;SAFA;WDWOSDDTWPCRCCDCSW;;;WD) |
| Subclass of | Leaf |
| Poss-Superiors | Class-Store |
| MAY contain | COM-CLSID COM-InterfaceID COM-Other-Prog-Id COM-ProgID COM-Treat-As-Class-Id File-Extension Implemented-Categories Managed-By MIME-Types Required-Categories |

Each application in an organizational unit may be categorized so as to belong in a set of categories, such as "spreadsheet" or "word processor." Application categories are domain specific, and are maintained by a domain administrator. When an application is published, the administrator may associate it with any number these defined categories. Categories are used to enable the desktop user to select a published application (described below) through the Add/Remove Programs applet or the like. Application categories are GUID values associated with descriptions, which are locale-specific string values. Descriptions for any number of locales may be stored for a given category. Categories are maintained (added, removed, renamed) using IClassAdmin methods, described below. Global Component Categories are stored under the CN=Categories container. The Directory object class for these objects is Category-Registration, while Key Fields include ImplementedClassID, RequiredClassId, and relationships are N-to-N with Classes. TABLE 4 describes a component category object:

TABLE 4

| Common-Name | Category-Registration |
|---|---|
| Admin-Display-Name | Category-Registration |
| Admin-Description | Category-Registration |
| Object-Class | Class-Schema |
| Comment | Class store: registration information for a component category |
| LDAP-Display-Name | CategoryRegistration |
| Governs-ID | 1.2.840.113556.1.5.74 |
| Class Type | Structural Class |
| Rdn-Att-Id | Common-Name |
| Schema-ID-GUID | {7d6c0e9d-7e20-11d0-afd6-00c04fd930c9} |
| Default UI State | Hidden |
| System-only | FALSE |
| Default-Security-Descriptor | D: (A;;RPWPCRCCDCLCLORCWOWDSDDTSW;;;DA) (A;;RPWPCRCCDCLCLORCWOWDSDDTSW;;;SY) (A;;RPLCLORC;;;AU) S: (AU;SAFA;WDWOSDDTWPCRCCDCSW;;;WD) |

TABLE 4-continued

| Common-Name | Category-Registration |
|---|---|
| Subclass of | Leaf |
| Poss-Superiors | Class-Store |
| MAY contain | Category-Id |
| | Locale-ID |
| | Localized-Description |
| | Managed-By |

The class store 70 thus includes a variety of properties and relationships for each of its various application packages. In general, as set forth in TABLE 2 (above), these include deployment state of the application, global details such as deployment name, publisher of the application, version, and a source for additional information. Also included is installation specific information, used for causing the application to be partially or fully installed on a desktop, activation specific information, used for finding the correct application to launch for an OLE or Shell activation, including, ClassID, File Extension and ProgID associations of the application. Platform specific information is also included, providing information on which hardware architecture and what operating system (and versions thereof) are required to run the application, along with specifying a set of supported locales. Moreover, upgrade relationships with other applications is included.

In accordance with one aspect of the present invention, the class store 70 and the containers 72, 74 and 76 thereunder thus provide the information for deploying applications in a network. In particular, two important mechanisms for deploying applications are supported, referred to as Assigning and Publishing, as described in copending U.S. Patent Applications entitled "Method and System for Assigning and Publishing Applications" and "Method and System for Advertising Applications," assigned to the Assignee of the present invention, filed concurrently herewith, and hereby incorporated by reference herein in their entireties.

In general, an assigned application is an application that is explicitly made available to users in a group or organizational unit into which it has been deployed. Assigned applications appear to be installed on a desktop, such as by appearing in the Start Menu and/or on shortcut icons on the desktop, and the user is not required to perform any special action to get an assigned application. More particularly, assigned applications are advertised as being available by default, i.e., relevant registry entries, Start Menu links, shortcuts and icons (i.e., advertising binaries) are automatically placed on the machine at user logon. Note that if the application is assigned to a user, it is available to that user on any machine onto which the user logs on, while if the application is assigned to a machine, then it is available to all users who log on to that machine.

An assigned application may be started by clicking on a file having an extension associated with that application (e.g., Microsoft® Word for a .doc file) or via ClassId based activation. Note that the executable code and the like of an assigned application may not be physically loaded on the machine at logon. Instead, the application is advertised as being installed, after which the first use of an assigned application on a machine may trigger appropriate pieces of the application to be copied onto the machine. To enforce assigned application policy, when an assigned application is uninstalled, orphaned or upgraded, a subsequent logon (user) or reboot (machine) causes the correct application to be advertised on the desktop, as described below with particular reference to FIG. 5A.

Alternatively, a published application is an application that is available to users in a group or organizational unit into which it has been published, however unlike assigned applications, published applications do not appear installed on a desktop. For example, the administrative action of publishing an application does not make a reference to that application appear in a user's Start Menu. In general, a published application has no presence on a user's machine until the published application is automatically or manually installed on a desktop, i.e., the application becomes assigned to the user's profile. More particularly, published applications (those set for auto-install) are automatically assigned to a user's profile when activated by clicking on a file with an associated file extension or via ClassID activations. Moreover, a user may manually install a published application such as via an "Add/Remove Programs" applet dialog box or the like. Once a published application is installed, the user sees the application as if it was previously assigned, however, unlike an assigned application, if the published application is removed, it will not be present at the next user logon.

In general, deployed applications in the Class Store may be in one of the states set forth in TABLE 5, below:

TABLE 5

Assigned
Published with AutoInstall
Published with no AutoInstall
Minor Revision (Patch)
Upgraded with uninstall
Upgraded without Uninstall
Uninstall
Orphan
Pilot Deployment More particcularly, the deployment state is maintained in the Package Flags, (TABLE 2), a set of bit flags that indicate the deployed state of an application, as set forth in more detail in TABLE 6 (only certain combinations of the flags are valid):

TABLE 6

| | |
|---|---|
| ACTFLG_Published | Application is in Published State. |
| ACTFLG_Assigned | Application is in Assigned State; Will be mandatory, made available. |
| ACTFLG_UserInstall | May be installed by desktop user using Add/Remove Programs applet. |
| ACTFLG_OnDemandInstall | May be automatically installed during activation by Shell/OLE/VB based on a File Extension, CLSID or ProgId. |
| ACTFLG_Orphan | This application is Orphaned. It is no longer deployed, and all existing installs may be left as is. |
| ACTFLG_Uninstall | This application is to be Uninstalled on all desktops where it was installed as a result of this deployment. |
| ACTFLG_Pilot | This application is available as a Pilot Only. As such it is not deployed, but may be installed using Add/Remove Programs. |

Also maintained are Policy Removal Action Flags, which denote whether the application is set to be Orphaned or Uninstalled when a policy to which the application belongs is removed, as shown below in TABLE 7. In the absence of either setting, the default setting for the Policy will apply.

TABLE 7

| | |
|---|---|
| ACTFLG_OrphanOnPolicyRemoval | Orphan the application when Policy is removed. |
| ACTFLG_UninstallOnPolicyRemoval | Uninstall the application when Policy is removed. |

Additional state information maintained with an application (TABLE 2) includes a Last Update Time Stamp, indicating the Time when the package or its deployment properties were last modified. Also, installation-related information maintained with an application includes a packaging type, which describes the packaging or binary format, (e.g., MSIPackage, EXEPackage, DLLPackage and CABPackage), and a file path for script, which identifies the UNC or HTTP path for the package file. For an MSI package, this is the advertisement script (.aas file), and for an EXE, DLL or CAB package this is the EXE, DLL or CAB file.

Also maintained for an application (TABLE 2) is state information to be used at the time of package installation, identifying which other applications this package may upgrade or overwrite. For each script it can upgrade, the manner in which it upgrades may be set as "Overlay" (install over the other application), or uninstall the other before installing this application. Overlay and uninstall before installing are described below with particular reference to FIG. 5B.

OLE and Shell activation properties may also be provided (TABLE 2) to associate a package with the object Classes (ClassIDs) implemented thereby, if any. ProgIDs provide user-friendly names for the Object Classes, while file types (based on File Extensions) are listed that the package knows to deal with, e.g., open, edit and/or print. In the event that multiple published applications are able to understand and service a particular file type, the directory may have administrator-specified priority to determine the application to be selected for a given file type. Additionally, COM Interfaces or Type-Libraries may include definition or marshalling information therewith.

Also maintained in the schema (TABLE 2) is product-related information, i.e., a Major and Minor version number of the product, and a serial revision tracking number, a DWORD that tracks the revision number for an application. Each patch applied to the corresponding application increments this sequence number. A product code in the form of a GUID provides the unique family identification of the product, and the publisher of the application is maintained. Lastly a Help URL may provide the URL of a web-site for additional information about the application.

Figure 4:
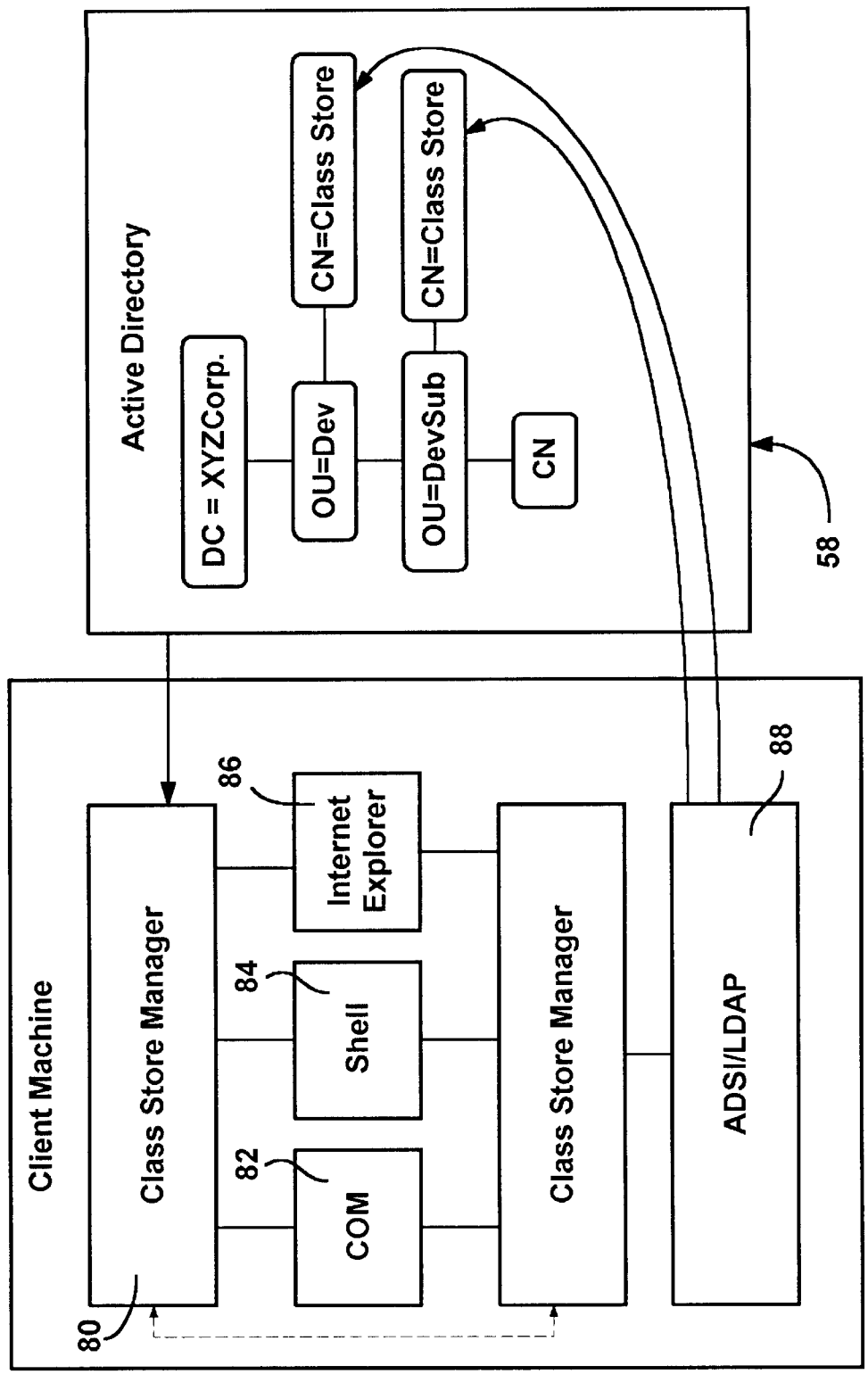
FIG. 4 is a block diagram representing various components utilizing the class store schema to implement application deployment policy in accordance with one aspect of the present invention.

For customized administration and programmatic query/installation for specific components and packages, the class store also offers a set of interfaces and APIs. As shown in FIG. 4, a Class Store Manager object 80 provides a consolidated query of one or more class stores, using a suitable protocol such as LDAP or ADSI 88 to obtain the information. The manager 80 exposes an interface, IclassAccess, to provide access to information about applications, components, and services in a class store (e.g., 70), and also provides an interface for query by Component Category, ICatInformation. Individual class store providers expose the IClassAdmin interface, which administers a specific class store container. The following sets forth the Class Store APIs and interfaces:

CsCreateClassStore

STDAPI
CsCreateClassStore (LPOLESTR szCsPath)
This API creates an empty Class Store for the specified group policy.

CsGetClassStore

STDAPI
CsGetClassStore(LPOLESTR szCsPath, void **ppIClassAdmin)
This API takes the Active Directory DN for a Class Store and returns an IClassAdmin interface pointer for it.

CsDeleteClassStore

STDAPI
CsDeleteClassStore(LPOLESTR szCsPath)
This API takes the Active Directory DN for a Class Store and removes the Class Store and thereby removes Application management Policy for the Group Policy.

CsGetClassStorePath

STDAPI
CsGetClassStorePath(LPOLESTR szPolicyPath, LPOLESTR *pszCsPath)
This API takes the DN of a group policy object and returns the class store DN if there is application policy in force.

CsSetClassStorePath

STDAPI
CsSetClassStorePath(LPOLESTR szPolicyPath, LPOLESTR szCsPath)
APIs—Getting a List of App Categories CsGetAppCategories STDAPI
CsGetAppCategories (APPCATEGORYINFOLIST *pAppCategoryList)
This API returns the complete list of Application Categories GUIDs and Descriptions for a given Locale. Add/Remove Programs applet/wizard and the Application Deployment Editor (ADE) call this API to get the definitive list of Application Categories.
APIs—Queries and Enumeration.

| CsEnumApps | | |
|---|---|---|
| STDAPI CsEnumApps | (LPOLESTR<br>GUID<br>ULONGLONG<br>DWORD<br>IEnumPackage | pszPackageName,<br>*pCategory,<br>*pLastUsn,<br>dwAppFlags,<br>**ppIEnumPackage); |

This API is used to get applications deployed for user or machine policy. Filters may be specified to narrow the selection by "changes since," deployment flags and application category. This API returns an interface pointer for an enumerator (IEnumPackage) that can be used to enumerate using an appropriate set size.

Depending upon whether this API is called under User credentials OR LOCAL SYSTEM credentials, either the user or the machine policy is used. The enumerator works across all class stores in the user's or machine's profile.

This API is used by Add/Remove programs to select Corporate Apps and from winlogon to process application policy at logon, and is equivalent to calling CsGetClassAccess to get an IClassAccess pointer and then calling EnumPackages method on this pointer.

| CsGetAppInfo | | | |
|---|---|---|---|
| STDAPI CsGetAppInfo | (uCLSSPEC | * | pclsspec, |
| | QUERYCONTEXT | * | pQueryContext, |
| | PACKAGEDISPINFO | * | pPackageInfo); |

This API is used to search for applications or COM component implementations that can satisfy activation request from COM (OLE) 82 or Shell 84. This supports on-demand install by finding if a deployed application would be able to satisfy the CLSID, File Extension or ProgID based activation. The on-demand installation of software implementations including applications is described in copending United States Patent Applications entitled "Method and System for On-Demand Installation of Software Implementations" and "Software Implementation Installer Mechanism," assigned to the same assignee as the present invention, filed concurrently herewith and hereby incorporated herein by reference in their entireties.

Note that the user's policy is used, i.e., the search is applied to the class stores in the user's policy from bottom to top order, whereby the lowest Organizational Unit with application policy takes precedence.

This API is used by COM object activation when an implementation is not found in the local machine, as described below. It is also used by a Shell 84 application launch when a file extension based activation does not find an application for a file extension in the local registry. Note that this API is equivalent to calling CsGetClassAccess to get an IClassAccess pointer and then calling GetAppInfo method.

CsGetClassAccess

STDAPI CsGetClassAccess(IClassAccess ** ppIClassAccess);

This API returns a IClassAccess interface pointer for the application policy. The interface pointer may be used to invoke methods to query into or enumerate applications that are deployed. Depending upon whether this is called under User credentials OR LOCAL SYSTEM credentials either the user or the machine policy is used.

APIs—Free Data Structures

```
STDAPI ReleasePackageInfo
    (PACKAGEDISPINFO *pPackageInfo);
STDAPI ReleasePackageDetail
    (PACKAGEDETAIL *pPackageDetail);
STDAPI ReleaseAppCategoryInfoList
    (APPCATEGORYINFOLIST *pAppCategoryInfoList);
```

These APIs free data structures allocated by Class Store APIs.

Class Store Interfaces

| Interface IClassAccess |
|---|
| IClassAccess::GetAppInfo |
| HRESULT GetAppInfo( |
|     [in] UCLSSPEC *pClassSpec, |
|     [in] QUERYCONTEXT *pQryContext, |
|     [out] PACKAGEDISPINFO *pInstallInfo |
| typedef union switch (DWORD tyspec) |
| { |
|     case TYSPEC_CLSID: |
|         CLSID clsid; |
|     case TYSPEC_IID: |
|         IID iid; |
|     case TYSPEC_TYPELIB: |
|         GUID typelibID; |
|     case TYSPEC_FILEEXT: |
|         LPOLESTR pFileExt; |
|     case TYSPEC_MIMETYPE: |
|         LPOLESTR pMimeType; |
|     case TYSPEC_PROGID: |
|         LPOLESTR pProgId; |
|     case TYSPEC_FILENAME: |
|         LPOLESTR pFileName; |
|     case TYSPEC—JAVACLASS: |
|         LPOLESTR pJavaClassName; |
|     case TYSPEC_PACKAGENAME: |
|         struct { |
|             LPOLESTR pPackageName; |
|             GUID GpoId; |
|         } ByName; |
|     case TYSPEC_SCRIPTNAME: |
|         struct { |
|             LPOLESTR pScriptName; |
|             GUID GpoId; |
|         } ByScript; |
| } uCLSSPEC; |

This method is used to search for applications or COM component implementations that can satisfy activation requests from COM (OLE) 82 or Shell 84, thereby supporting on-demand install by finding if a deployed application would be able to satisfy the CLSID, File Extension or ProgID based activation. Note that the user's policy is used, i.e., the search is applied to the class stores in the user's policy from bottom to top order, whereby the lowest Organizational Unit with application policy takes precedence.

| IClassAccess::EnumPackages | | |
|---|---|---|
| HRESULT EnumPackages ( | | |
| [in, unique] | LPOLESTR | pszPackageName, |
| [in, unique] | GUID | *pCategory, |
| [in, unique] | ULONGLONG | *pLastUsn, |
| [in] | DWORD | dwAppFlags, |
| [out] | IEnumPackage | **ppIEnumPackage |
| ); | | |

Class Store package enumeration. This method returns an Enumerator interface that allows accessing the list of application packages deployed to an user.

| Interface IClassAdmin | | |
|---|---|---|
| IClassAdmin:AddPackage | | |
| HRESULT AddPackage( | | |
| [in] | LPOLESTR | pszPackageName, |
| [in] | PACKAGEDETAIL | *pPackageDetail |

-continued

| Interface IClassAdmin | | |
|---|---|---|
| ); | | |
| IClassAdmin::RemovePackage | | |
| HRESULT RemovePackage( | | |
| [in] | LPOLESTR | pszPackageName, |
| [in] | DWORD | dwFlags |
| ); | | |
| IClassAdmin::ChangePackageProperties | | |
| HRESULT ChangePackageProperties( | | |
| [in] | LPOLESTR | pszPackageName, |
| [in, unique] | LPOLESTR | pszNewName, |
| [in, unique] | DWORD | *pdwFlags, |
| [in, unique] | LPOLESTR | pszUrl, |
| [in, unique] | LPOLESTR | pszScriptPath, |
| [in, unique] | UINT | *pInstallUiLevel, |
| [in, unique] | DWORD | *pdwRevision |
| ); | | |
| IClassAdmin::ChangePackageCategories | | |
| HRESULT ChangePackageCategories( | | |
| [in] | LPOLESTR | pszPackageName, |
| [in] | UINT | cCategories, |
| [in, size_is(cCategories)] | GUID | *rpCategory |
| ); | | |
| IClassAdmin::SetPriorityByFileExt | | |
| HRESULT SetPriorityByFileExt( | | |
| [in] | LPOLESTR | pszPackageName, |
| [in] | LPOLESTR | pszFileExt, |
| [in] | UINT | Priority |
| ); | | |
| IClassAdmin::EnumPackages | | |
| HRESULT EnumPackages( | | |
| [in, unique] | LPOLESTR | pszFileExt, |
| [in, unique] | GUID | *pCategory, |
| [in] | DWORD | dwAppFlags, |
| [in, unique] | DWORD | *pdwLocale; |
| [in, unique] | CSPLATFORM | *pPlatform, |
| [out] | IEnumPackage | **ppIEnumPackage |
| ); | | |
| IClassAdmin::GetPackageDetails | | |
| HRESULT GetPackageDetails( | | |
| [in] | LPOLESTR | pszPackageName, |
| [out] | PACKAGEDETAIL | *pPackageDetail |
| ); | | |
| IClassAdmin::GetAppCategories | | |
| typedef struct tagAPPCATEGORYINFO | | |
| { | | |
| LCID | Locale; | |
| LPOLESTR | pszDescription; | |
| GUID | AppCategoryId; | |
| } APPCATEGORYINFO; | | |
| typedef struct tagAPPCATEGORYINFOLIST | | |
| { | | |
| DWORD | cCategory; | |
| [size_is(cCategory), unique] | APPCATEGORYINFO | *pCategoryInfo; |
| } APPCATEGORYINFOLIST; | | |
| HRESULT GetAppCategories( | | |
| [in] | LCID | Locale, |
| [out] | APPCATEGORYINFOLIST | *pAppCategoryList |
| ); | | |
| IClassAdmin::RegisterAppCategory | | |
| HRESULT RegisterAppCategory( | | |
| [in] | APPCATEGORYINFO | *pAppCategory |
| ); | | |
| IClassAdmin::UnregisterAppCategory | | |
| HRESULT UnregisterAppCategory( | | |
| [in] | GUID | *pAppCategoryId |
| ); | | |
| IClassAdmin::Cleanup | | |
| HRESULT Cleanup( | | |
| [in] | FILETIME | *pTimeBefore |
| ); | | |

| Interface IEnumPackage | | |
|---|---|---|
| typedef struct tagPACKAGEDISPINFO | | |
| { | | |
| LPOLESTR | pszPackageName; | |
| DWORD | dwActFlags; | |
| CLASSPATHTYPE | PathType | |
| LPOLESTR | pszScriptPath; | |
| LPOLESTR | pszPublisher; | |
| LPOLESTR | pszUrl; | |
| UINT | InstallUiLevel; | |
| ULONG | cScriptLen; | |
| ULONGLONG | Usn; | |
| DWORD | dwVersionHi; | |
| DWORD | dwVersionLo; | |
| DWORD | dwRevision; | |
| GUID | ProductCode; | |
| GUID | *pClsid; | |
| GUID | GpoId; | |
| LPOLESTR | pszPolicyName; | |
| UINT | cUpgrades; | |
| [size_is(cUpgrades)] | LPOLESTR | *prgUpgradeScript; |
| [size_is(cUpgrades)] | DWORD | *prgUpgradeFlag; |
| } PACKAGEDISPINFO; | | |
| interface IEnumPackage : IUnknown | | |
| { | | |
| HRESULT Next( | | |
| [in] | ULONG celt, | |
| [out, size_is(celt), length_is(*pceltFetched)] PACKAGEDISPINFO *rgelt, | | |
| [out] | ULONG *pceltFetched | |
| ); | | |
| HRESULT Skip( | | |
| [in] | ULONG celt); | |
| HRESULT Reset(); | | |
| HRESULT Clone( | | |
| [out] | IEnumPackage **ppenum); | |
| } | | |

The methods are standard IEnumXXX methods and have similar semantics. Next ( ) allows enumeration of the next celt number of packages, Skip ( ) lets the caller skip celt number of packages during enumeration, Reset ( ) sets the starting point back to the first package in the set and Clone ( ) creates an identical enumerator instance.

For each package the following information is returned:

TABLE 8

Figure 5A:
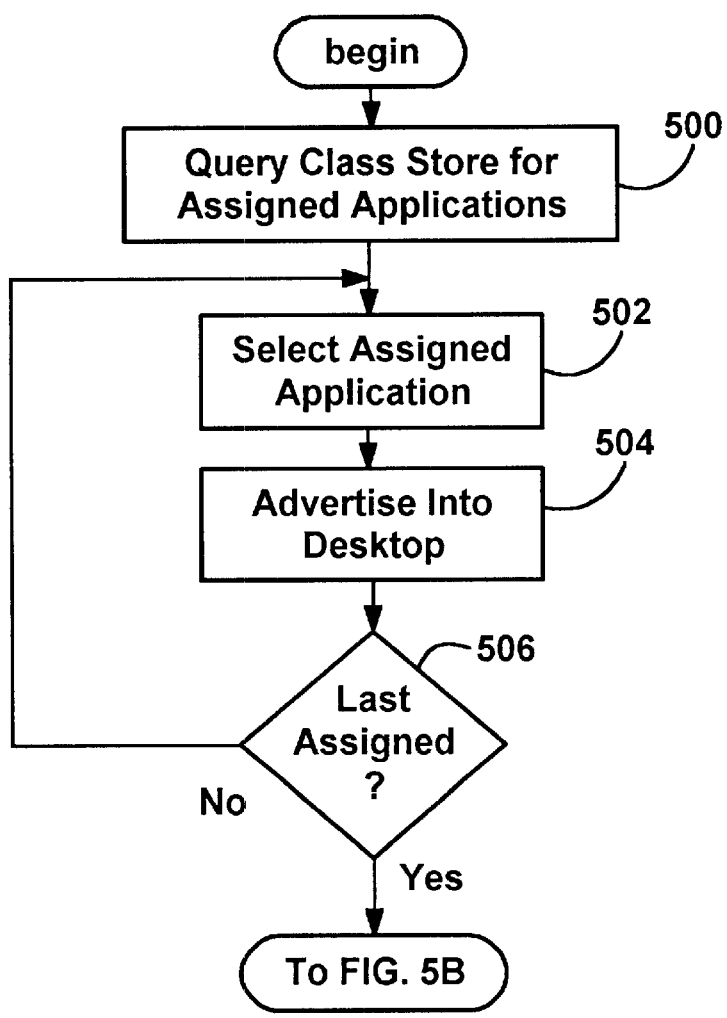
FIGS. 5A–5B comprise a flow diagram generally representing the steps taken upon user logon to implement application deployment policy according to state information maintained for applications in a class store in accordance with one aspect of the present invention.
Figure 5B:
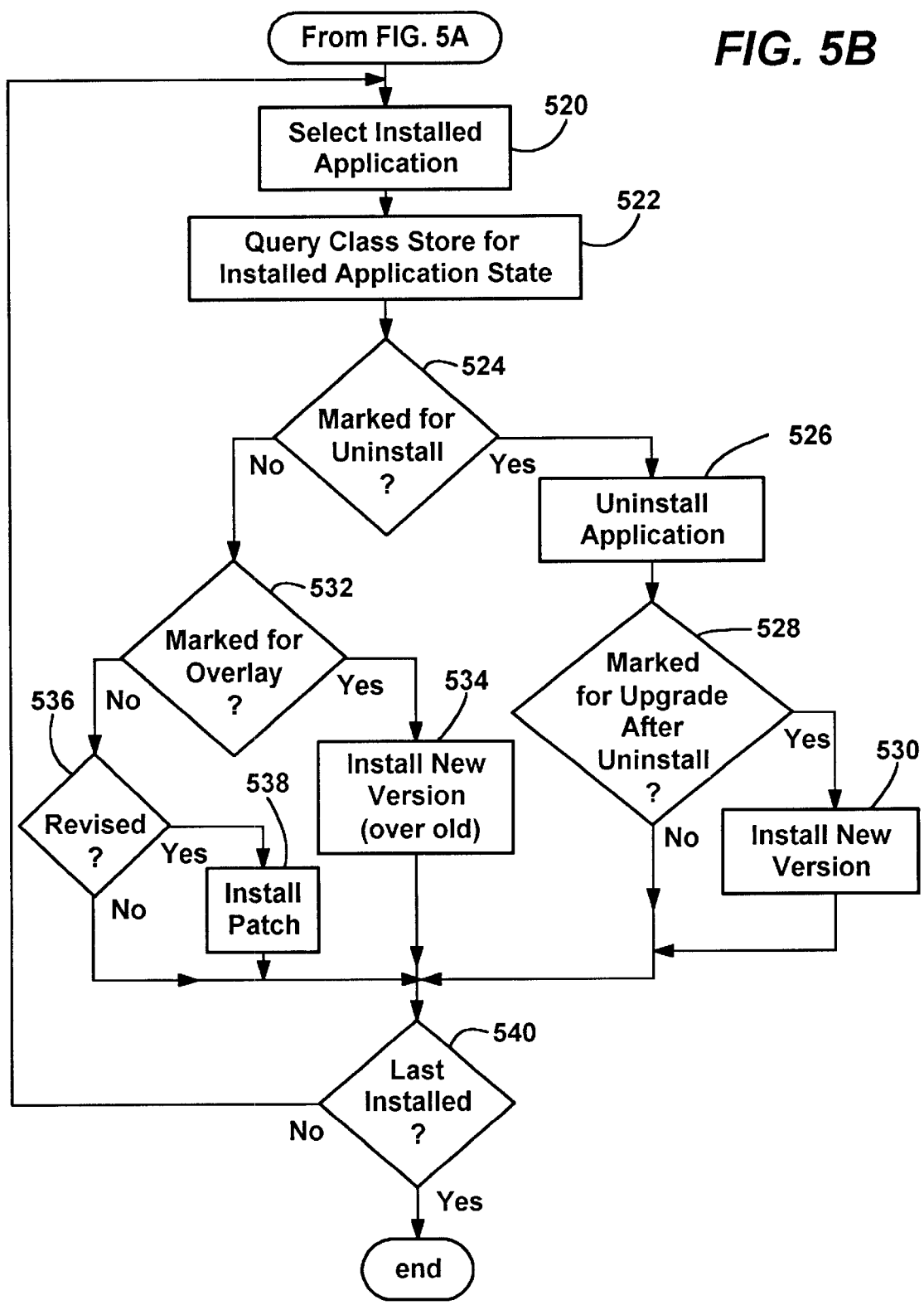

PszPackageName: Deployment name of Package.
DwActFlags: Deployment state.
PathType: Package Type.
PszScriptPath: Script Path for Package
CscriptLen: Size of the Script for the Package
PszPublisher: Name of Package Publisher.
PszUrl: URL where more info is available.
InstallUiLevel: UI Level for installation.
Usn: Deployment name of Package
DwVersionHi: Package Major Version Number
DwVersionLo: Package Minor Version Number
DwRevision: Package Revision Number
ProductCode: MSI Product Code
PclsId: If a COM component, one CLSID the package implements.
GpoId: Policy GUID of the group policy package is deployed
PszPolicyName: Policy Name of the group policy package is Deployed
Cupgrades: Number of Upgrade relationships
PrgUpgradeScript: Script that has upgrade relationship
PrgUpgradeFlag: Type of upgrade relationship
• Upgrade
• Upgrades w/Uninstall
• UpgradedBy Turning to an explanation of how the class store schema is utilized to implement application deployment policy, FIGS. 5A–5B represent the general steps taken upon user logon. Note that machine policy is similarly applied upon machine reboot, but for purposes of simplicity is not described in detail herein.

In general, at logon, the Class Stores (such as the class store 70) are queried by the client-side class store manager 80 to determine what application processing is required. The processing is based on what applications are already installed by the user and what applications are assigned to the user. Note that installed applications may either be previously assigned applications or published applications that the user has installed.

FIG. 5A shows the general steps for processing assigned applications at each user logon, beginning at step 500 wherein the class store 70 (and any other associated class stores) is queried via a suitable API for the assigned application and accompanying information. At every logon, the applications currently assigned to the user are advertised into the desktop to ensure that policy is enforced. This action prevents the user from uninstalling an assigned application and, for example, installing another application for the same functionality, since at each logon, the application identified in the class store under the policy object is advertised. To this end, at step 502, the first assigned application is selected, and at step 504 is advertised, which typically includes adding the application to the start menu and possibly adding a shortcut icon to the desktop, and writing appropriate information into the system registry. Step 506 causes the processing to repeat for the applications assigned to the user in the class store or stores associated with the user's group policy objects (which in turn are associated with the user's domain and organizational units).

FIG. 5B generally shows the processing of applications that are installed on the user's machine, based on the state information maintained in the class store corresponding to each such application as described above. At step 520, the first installed application is selected, and at step 522, the state information therefor is obtained from the class store using an appropriate API as also described above. Step 524 tests to see if this application is to be uninstalled, i.e., the administrator has marked this application to be removed from the user's profile. If so, step 524 branches to step 526 to uninstall the application, after which step 528 tests to see if another application is to be installed in its place. If so, step 530 is executed to install the replacement, typically a new version of the application. Note, however, that the application is not necessarily physically downloaded to the machine at this time, but rather, is only advertised as being installed.

If at step 524 the selected application is not to be uninstalled, step 524 instead branches to step 532 to test if the application was marked for overlay, i.e., another application will be installed essentially over this one, typically handling any uninstall operations as part of its own install procedure. For example, some programs may be upgraded by simply overwriting certain executable files and dynamic link libraries with new ones, whereby the overlay option is desirable. In any event, if an application is marked for overlay, step 532 branches to step 534 to perform the overlay install operation.

If not marked for overlay at step 532, step 532 branches to step 536 to determine if the selected application has been revised, i.e., has a patch that needs to be applied thereto. If so, step 538 is executed to install the patch, otherwise no action is taken with this application. Step 540 repeats the process for each installed application. In this manner, via the class store schema, application deployment policy is implemented for a given user on a given machine.

Figure 6:
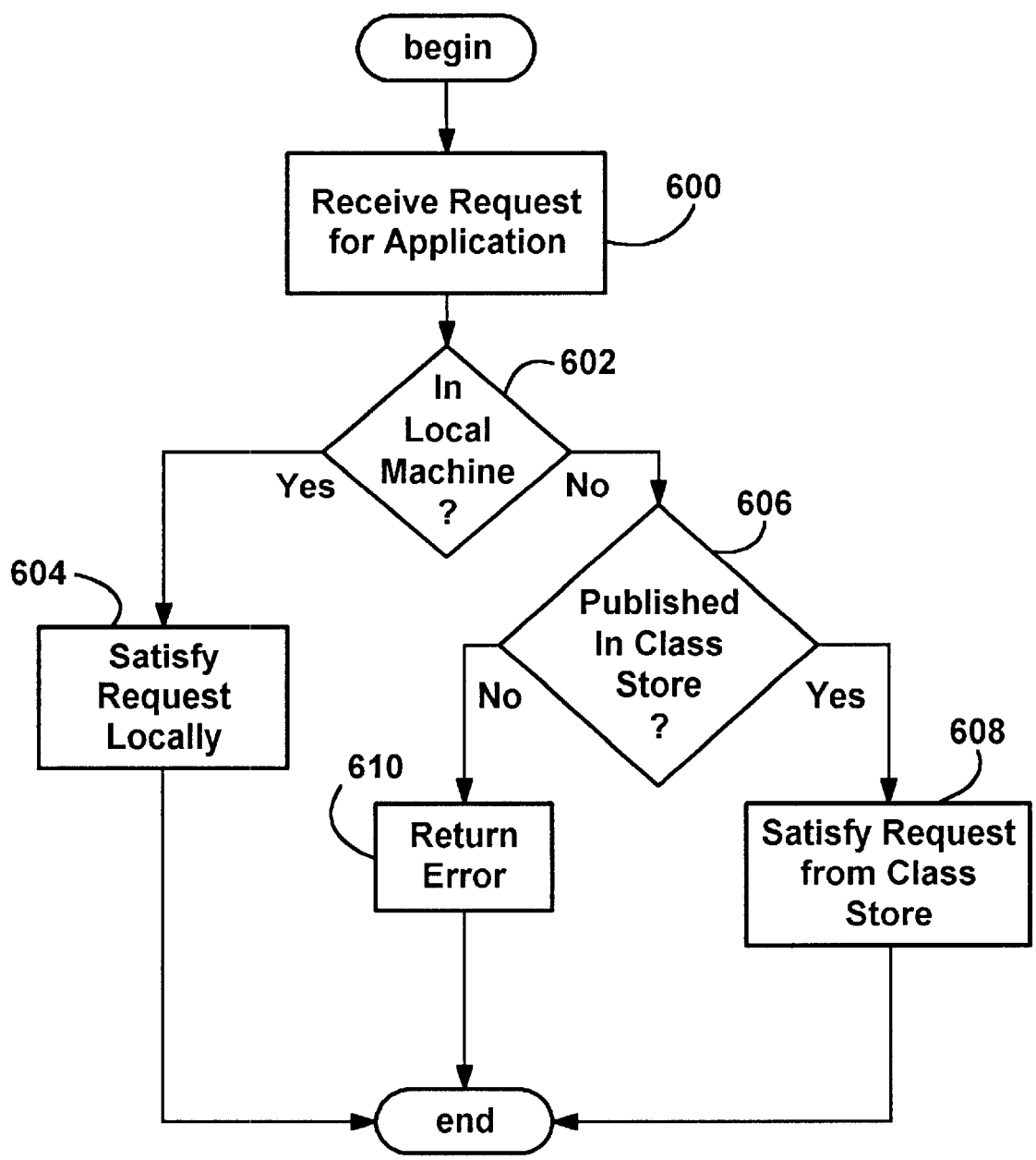
FIGS. 6 and 7 are flow diagrams generally representing the steps taken when attempting to locate an application and a software implementation, respectively, using the class store as needed in accordance with one aspect of the present invention.

While FIGS. 5A and 5B handle assigned and installed applications, the concept of publishing applications also provides significant administrative benefits. One significant benefit to publishing applications is to let the operating system locate such applications and install them only as needed. This is possible for applications that advertise their services to Shell or OLE in terms of the File Types, the ClassID, the ProgID serviced by those applications. For example, as shown in FIG. 6, when a desktop user tries to activate launch an application that can open a particular file type or OLE embedding (step 600), Shell 84 or COM (OLE) 82 first look in the registry for the appropriate application information (step 602) to satisfy the launch request (step 604). If such an application is not installed locally and is published (step 606), Shell or OLE performs a Directory lookup, finds the application and installs it (step 608), without any prompting of the user.

By way of example, consider a user receiving a Microsoft® Word document. The user opens the document, finds a flowcharting diagram embedded therein, and clicks on it to edit the diagram with an appropriate application. OLE (COM 82) looks in the registry for the CLSID of the embedded diagram and does not find it. However, an appropriate flowcharting application is published in the directory for this user's Organizational Unit, i.e., is identified in an application package of a class store under the organizational unit's policy. The class store manager 80 looks up the Directory to find a package that implements this CLSID, that is available to the user or machine, and is compatible with the processor and operating system of the machine. A Directory lookup returns the information necessary to assign this application into the user's profile, whereby the application is assigned to the user profile for this user, appropriate portions of the application are downloaded, and the user is able to view and/or edit the diagram. Note that for purposes of security, the Directory Lookup only selects packages that have READ access (e.g., in an Access Control List) for the user.

In another example, consider a user browsing a file server and finding a sample spreadsheet, abc.xls. When the user clicks on the spreadsheet file to open it, Shell 84 looks in the registry for the File Extension .XLS, but does not find it. However, Microsoft® Excel97 is published for this user's Organizational Unit. A directory lookup returns the information necessary to assign Excel97 into this user's profile, whereby Excel97 is assigned to the user profile for this user, appropriate portions of the application are downloaded, and the user is able to view and/or edit the spreadsheet.

In sum, when an application that can service a request is not found in the local profile, Shell or OLE make a Class Store lookup to find and install a Published Application, if there is one, that can service the request. Note that the Directory lookup takes into account the type of activation. Shell or OLE look into the registry for File Extension, Object Class ID, Object Prog ID, Interface ID or User and Machine Locale (the locale of the application needs to suit the user and machine locale setting). A general rule is to find an application whose locale matches the user's default locale, the machine's default locale, or the user's default Language. Also, as described above, each package is associated with a list of hardware architecture and operating systems on which it is supported on. The Directory Lookup matches the client machine's architecture and operating system in this list. Lastly, when the activation is for a certain file extension, (e.g., .XLS) and the Directory has more than one published application that can service that file type, then an administrator specified priority is used to pick the most preferred one.

Figure 7:
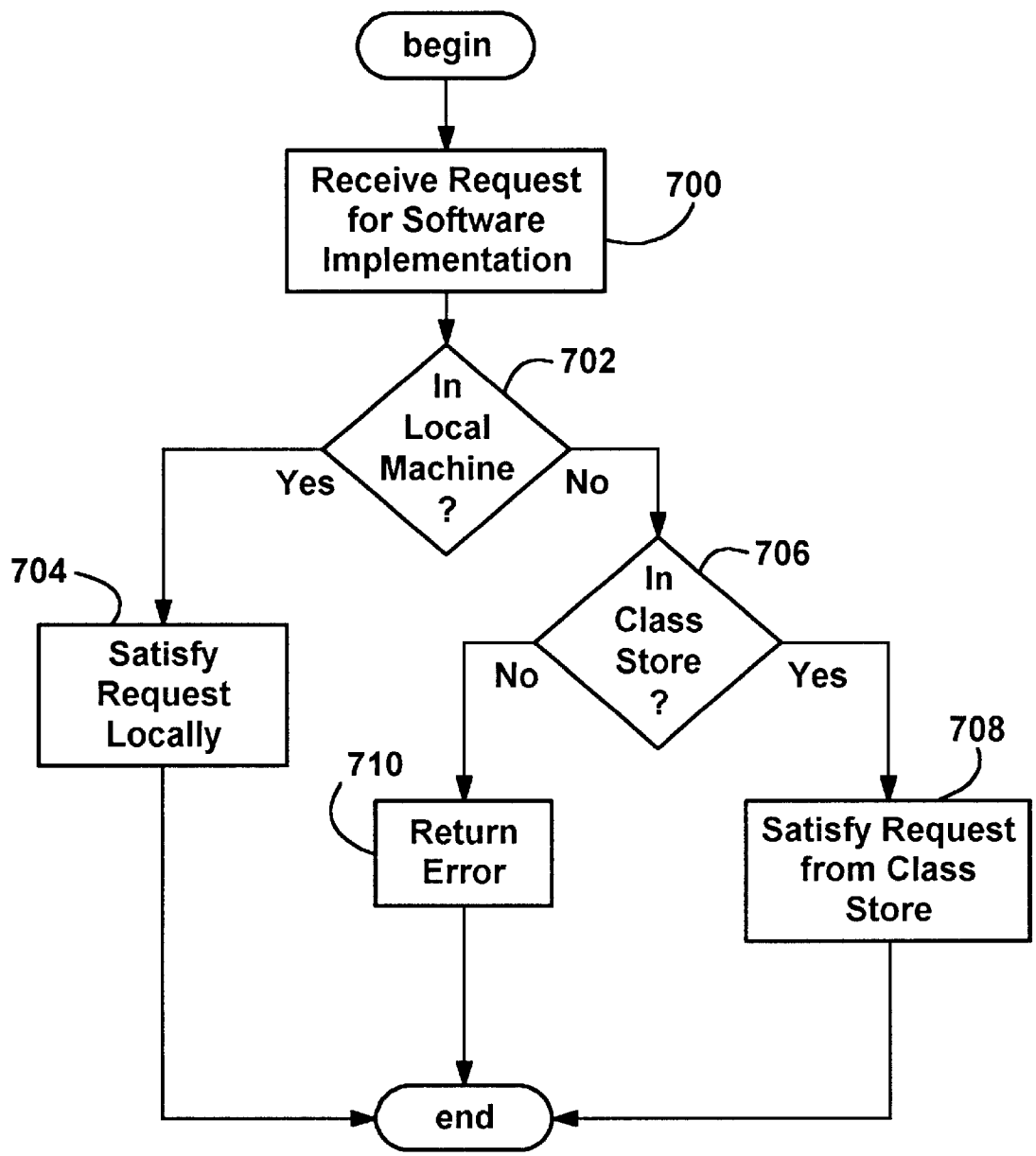

In addition to applications, the COM libraries 82, Shell 84 and Internet Explorer 86 automatically use the class store schema to install missing components. As generally represented in FIG. 7, if a requested (step 700) software implementation (e.g., object class) is available in the local registry (step 702), the system provides it (step 704). If not found, however, the system instead looks in the class stores (step 706) for a suitable implementation and returns it if found (step 708).

As can be seen from the foregoing detailed description, there is provided a class store schema that provides centralized information to administer a network. The schema enables the management and deployment of applications, components and services across a computer network.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-readable medium having stored thereon a data structure, comprising,
    (a) a first data field containing data representing an identity of an executable software module;
    (b) a second data field containing data representing network deployment state information of the executable software module in the first data field;
    (c) a third data field containing data representing network location information for the executable software module in the first data field; and
    if the network deployment state; information in the second field indicates that the executable software module identified in the first field is to be made available to a user of a client machine of the network, making the executable software module available to the user when needed, independent of which client machine the user is using, by automatically accessing the network location information and automatically installing the executable software module on the client machine based on the location information.

2. The computer-readable medium having stored thereon the data structure of claim 1 wherein the deployment information comprises state information indicative of whether the application is assigned to the policy recipient.

3. The computer-readable medium having stored thereon the data structure of claim 1 wherein the deployment state information comprises state information relating the executable software module to another executable software module.

4. The computer-readable medium having stored thereon the data structure of claim 3 wherein the deployment state information indicates that the other executable software module is to be overwritten upon installing the executable software module.

5. The computer-readable medium having stored thereon the data structure of claim 3 wherein the deployment state information indicates that the other executable software module is to be uninstalled in conjunction with installing the executable software module.

6. The computer-readable medium having stored thereon the data structure of claim 1 wherein the executable software module is advertised to the user as being available for execution on the client machine prior to installing the executable software module.

7. The computer-readable medium having stored thereon the data structure of claim 1 wherein the deployment state information comprises information indicative of whether a patch is to be installed for the executable software module.

8. The computer-readable medium having stored thereon the data structure of claim 1 wherein the deployment state information comprises information indicative of a hardware processor compatible with the executable software module.

9. The computer-readable medium having stored thereon the data structure of claim 8 wherein the hardware processor information is used to determine whether the executable software module is compatible with the client machine.

10. The computer-readable medium having stored thereon the data structure of claim 1 wherein the deployment state information comprises information indicative of an operating system compatible with the executable software module.

11. The computer-readable medium having stored thereon the data structure of claim 10 wherein the operating system information is used to determine whether the executable software module is compatible with the client machine.

12. The computer-readable medium having stored thereon the data structure of claim 1 wherein the deployment state information comprises information indicative of class identifiers implemented by the executable software module.

13. The computer-readable medium having stored thereon the data structure of claim 1 wherein the deployment state information comprises information indicative of file types handled by the executable software module.

14. The computer-readable medium having stored thereon the data structure of claim 13 wherein the information indicative of file types comprises a list of file extensions.

15. The computer-readable medium having stored thereon the data structure of claim 1 wherein the network location information comprises information indicative of a network path.

16. The computer-readable medium having stored thereon the data structure of claim 15 wherein the network path information provides a network location where application advertisement script information is present.

17. The computer-readable medium having stored thereon the data structure of claim 15 wherein the network path information provides a network location where application advertisement binaries are present.

18. The computer-readable medium having stored thereon the data structure of claim 1 wherein the deployment state information comprises information indicative of another executable software module to be upgraded by the executable software module.

19. The computer-readable medium having stored thereon the data structure of claim 1 wherein the deployment state information comprises information indicative of another executable software module that can upgrade the executable software module.

20. The computer-readable medium having stored thereon the data structure of claim 19, wherein the deployment state information further comprises information indicative of the manner of upgrade.

21. The computer-readable medium having stored thereon the data structure of claim 20 wherein the information indicative of the manner of upgrade indicates that the upgrade will overlay the executable software module during installation of the other executable software module.

22. The computer-readable medium having stored thereon the data structure of claim 20 wherein the information indicative of the manner of upgrade indicates that the upgrade will uninstall the executable software module before installation of the other executable software module.

23. The computer-readable medium having stored thereon the data structure of claim 22 wherein the deployment state information comprises information indicative of a time when the executable software module was deployed.

24. The computer-readable medium having stored thereon the data structure of claim 1 wherein the deployment state information comprises information indicative of a time when the executable software module had its deployment state changed.

25. The computer-readable medium having stored thereon the data structure of claim 1 wherein the deployment state information comprises information indicative of whether the executable software module is to be orphaned on the user's machine.

26. The computer-readable medium having stored thereon the data structure of claim 1 wherein the deployment state information comprises information indicative of a uniform resource locator providing a location where further information can be found about this executable software module.

27. A computer-readable medium having stored thereon a data structure, comprising:
 a package capable of being deployed to a policy recipient;
 an object class container including registration information corresponding to the package:
 component categories information of the object class, including deployment state information corresponding to the package and network location information corresponding to a location of the package, and
 if the deployment state information indicates that the package is to be made available to the policy recipient, deploying the package to the policy recipient when needed by automatically accessing the network location information and automatically installing the package from the network to the policy recipient machine based on the network location information.

28. The data structure of claim 27 wherein the package includes an application program.

29. The data structure of claim 27 wherein the package includes a set of binary component implementations.

30. The data structure of claim 27 wherein the package includes a standalone component.

31. The data structure of claim 27 wherein the package includes version information.

32. The data structure of claim 27 wherein the deployment state information includes data indicating that the package is published to at least one policy recipient.

33. The data structure of claim 27 wherein the deployment state information includes data indicating that the package is assigned to at least one policy recipient.

34. In a computer network having a plurality of client machines and a plurality of policy recipients comprising client users or client machines, a method comprising:
 associating policy data with a policy recipient, the policy data including at least one class store containing application deployment information corresponding to the policy recipient, the application deployment information including an identity of at least one executable software module and a state of deployment therefor; and
 managing which executable software is available for use on a particular client machine based on the policy data by:
 1) accessing the at least one class store to determine the state of deployment information for a selected executable software module identified therein;
 2) comparing an actual state of deployment of the selected executable software module on the client machine to the state of deployment information for the selected executable software module determined from the at least one class store; and
 3) automatically configuring the client machine so that the actual state of deployment of the selected executable software module corresponds to the state of deployment information in the at least one class store.

35. The method of claim 34, further comprising, evaluating access control information associated with the at least class store.

36. The method of claim 34, wherein the policy recipient is a user, and wherein the policy data associated with that user makes at least one application program available to the user independent of which client machine in the network the user is using.

37. The method of claim 34, wherein automatically configuring the client machine occurs for the user each time the user logs onto that client machine.

38. The method of claim 34, wherein the policy recipient is a client machine, and wherein the policy data associated with that client machine makes at least one application program available to any user of the client machine.

39. The method of claim 34, wherein accessing the at least one class store indicates that the selected executable software module should not be installed on the client machine, wherein comparing an actual state of deployment indicates that the selected executable software module is installed, and wherein configuring the client machine includes uninstalling the selected executable software module from the client machine.

40. The method of claim 34, wherein configuring the client machine includes writing data related to the selected executable software module to a database maintained at the client machine.

41. The method of claim 40, wherein writing data to the database includes modifying a registry on the client machine.

42. The method of claim 34, wherein the selected executable software module comprises an application program, wherein configuring the client machine includes writing data related to the application program to the client machine to advertise the application as available for execution on the client machine regardless of whether it is actually installed on the client machine, and, if the application is later requested to be executed but is not installed for execution, automatically installing and executing the application on the client machine.

43. The method of claim 34, wherein configuring the client machine includes publishing the selected executable software module to the client machine by maintaining information on the client machine for automatically installing the selected executable software module on the client machine and executing it if later needed.

44. The method of claim 34, wherein accessing the at least one class store indicates that the selected executable software module should be patched on the client machine, and wherein configuring the client machine includes patching the selected executable software module on the client machine.

45. The method of claim 34, wherein accessing the at least one class store indicates that the selected executable software module should be overwritten on the client machine with another version thereof, and wherein configuring the client machine includes overwriting the selected executable software module on the client machine with the other version.

46. The method of claim 34, wherein accessing the at least one class store indicates that the selected executable software module should be uninstalled and replaced with another version thereof on the client machine, and wherein configuring the client machine includes uninstalling the selected executable software module and thereafter installing the other version of the selected executable software module on the client machine.

47. The method of claim 34, further comprising, receiving data corresponding to a class identifier at the client machine, querying the at least one class store to attempt to find executable software module deployment information associated with the class identifier, and if the class store includes deployment information for that class identifier, installing the executable software module based on the deployment information for that class identifier.

48. The method of claim 34 further comprising, receiving data corresponding to a file type at the client machine, querying the at least one class store to attempt to find executable software module deployment information associated with the file type, and if the class store includes deployment information for that file type:
   a) installing the executable software module based on the deployment information for that file type in the class store, and
   b) executing the executable software module.

49. The method of claim 34, wherein the deployment information in the class store further includes installation information of the selected executable software module, wherein accessing the at least one class store indicates that the selected executable software module should be installed on the computer system, wherein comparing the actual state of deployment indicates that the selected executable software module is not installed, and wherein configuring the computer system includes installing the selected executable software module on the computer system based on the installation information.

50. A computer-readable medium having computer-executable instructions for performing the method of claim 34.

51. The method of claim 34, wherein the selected executable software module comprises an application program, and wherein configuring the computer system includes, advertising the application by making the application appear available for execution on the computer system without installing the selected executable software module onto the computer system until needed.

52. In a computer network, a method comprising:
   associating a class store with a policy recipient, the class store containing an identity of an executable software module and network location information of the executable software module;
   receiving a request, at a client machine having a relationship with the policy recipient, to execute the executable software module;
   querying for information, in a system to registry of the client machine, for executing the executable software module, and if the information needed to execute the executable software module is not found:
   1) querying the class store for information corresponding to the executable software module;
   2) installing the executable software module based on the network location information in the class store; and
   3) executing the executable software module.

53. The method of claim 52 wherein the policy recipient corresponds to the client machine.

54. The method of claim 52 wherein the policy recipient corresponds to a user logged onto the client machine.

55. The method of claim 52 wherein receiving a request includes receiving a class identifier.

56. The method of claim 52 wherein receiving a request includes receiving file type data.

57. The method of claim 52 wherein installing the executable software module based on the network location information in the class store comprises, downloading at least one file from a network source.

58. In a computer network having a plurality of client machines and a plurality of policy recipients comprising client users or client machines, a system comprising:
   a policy object, the policy object containing a class store, the class store containing application deployment information including an identity of an executable software module a state of deployment for the executable software module, and network location information for the executable software module;
   a selected client machine having a relationship with a policy recipient that is associated with the policy object, the client machine having access to the policy object; and
   executable code on the client machine that receives a request corresponding to execution of the executable software module, wherein based on the request, the executable code:
   1) accesses the class store to obtain the state of deployment information for the executable software module;
   2) determines from the state of deployment information in the class store whether the policy recipient is able to execute the executable software module, and if so, automatically installs and executes the executable software module based on the network location information in the class store.

59. The system of claim 58 wherein the selected client machine corresponds to the policy recipient and the policy object comprises a machine policy object.

60. The system of claim 58 wherein a user logged onto the selected client machine corresponds to the policy recipient.

61. The system of claim 58 herein the executable code on the client machine comprises operating system code.

62. The system of claim 58 wherein the request corresponding to execution of the executable software module includes class identifier data.

63. The system of claim 58 wherein the request corresponding to execution of the executable software module includes file type data.

* * * * *